Oct. 26, 1943.     A. H. STEWART     2,333,076
METHOD OF MAKING GLASS ARTICLES
Filed Nov. 8, 1941
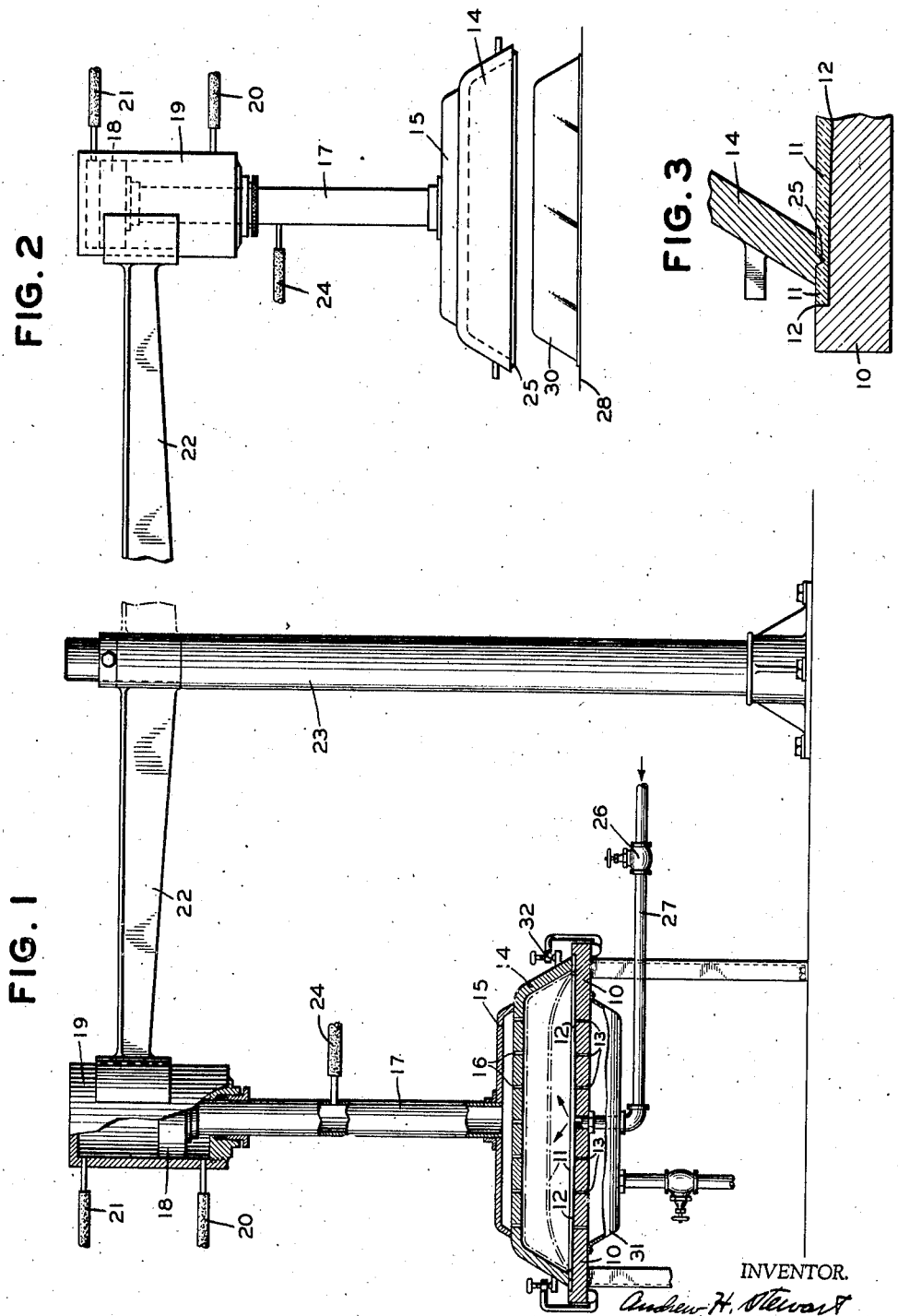
INVENTOR.
Andrew H. Stewart
BY
ATTORNEY Patented Oct. 26, 1943

2,333,076

UNITED STATES PATENT OFFICE 2,333,076

METHOD OF MAKING GLASS ARTICLES

Andrew H. Stewart, Beaver, Pa., assignor to The Phoenix Glass Company, Monaca, Pa., a corporation of West Virginia Application November 8, 1941, Serial No. 418,307

1 Claim. (Cl. 49—85)

This invention relates to glassware manufacture and more particularly to a method for making glass articles such, for example, as the light enclosing troughs used on fluorescent light fixtures, although it will be apparent from the following description that the invention is also adapted to the manufacture of a wide variety of other articles.

Heretofore, the difficulty of blowing articles of this size and type has compelled their manufacture by bending flat sheets, with the resulting limitation in the types of glass from which such articles could be made. An object of this invention is to provide a method of making glass articles of the type set forth by a blowing operation.

This and other objects which will be apparent to those skilled in the art are accomplished by this invention, one embodiment of which is shown in the accompanying drawing, in which Fig. 1 is an elevation, partly in section, of a glassware making machine for making glass lighting troughs in accordance with my improved method.

Fig. 2 is an elevation of the apparatus shown in Fig. 1 at the completion of a molding operation, and Fig. 3 is an enlarged section showing a portion of the blow mold and table.

In the particular embodiment of the invention which is illustrated in the accompanying drawing, a mold table 10 is preferably provided with a recess 11 in the top surface for receiving molten glass. The face of the depression is lined with a layer 12 of heat insulating material which is at the same time a poor conductor of heat and will not mar the glass. Carbon will be found satisfactory as well as other materials well known to those skilled in the art. Air vents 13 extend through the table to the glass supporting surface.

A mold 14 having a manifold 15 and vents 16 connecting the manifold with the mold cavity is mounted for vertical movement on a hollow plunger 17 adapted to be raised and lowered by a piston 18 in a cylinder 19 operated by fluid pressure through flexible connecting lines 20 and 21. The cylinder is supported in the outer end of an arm 22 mounted for rotation on any suitable support or standard 23. The manifold 15 is connected through the hollow plunger and flexible line 24 with a source of vacuum (not shown).

In operation, a layer or sheet of molten glass is spread evenly over the surface of the mold table, in the recess 11 when such recess is formed in the table, either by a flow device or with a ladle (not shown). The glass is spread out in a flat even sheet by rolling or in any other desired manner. If necessary, heat can be applied to the glass on the table to bring it to the desired molding temperature. During the spreading operation any excess glass can be pushed over the edge into a suitable receptacle.

When the glass is at the proper molding temperature a mold 14 is dropped in place on the glass sheet, a sharp edge 25, see Fig. 3, on the edge of the mold cutting into but not entirely through the glass so as to seal the mold cavity against leakage of air around the edge and at the same time forming a breakage line for subsequently removing excess glass from the finished articles. Preferably, the entire weight of the mold does not rest on the molten glass, but only sufficient to provide the requisite seal and trim line.

As soon as the mold is in position the vacuum is applied through the line 24 to raise the glass sheet from the table into the mold cavity, the air vents 13 permitting air to flow in under the sheet as it is lifted. When the glass has been lifted from the table and is approaching or has reached the wall of the mold cavity, as indicated in dotted lines in Fig. 1, fluid pressure is applied to the lower face of the glass through a valve 26 in line 27 extending through the mold table, and the glass thus blown against the mold wall.

The excess glass is then trimmed from around the mold and, with vacuum still applied to hold the glass in the mold, the latter is lifted from the mold table by the piston and cylinder 18 and 19 and swung over a receiving table 28 or other surface such as a carrying in paddle or the like on which the blown article 29 is deposited and then placed in a lear.

Fig. 1 shows a manifold 31 enclosing the vents 13 to provide a chamber in which an inert gas, steam, carbon dioxide or the like at atmospheric or greater pressure may be applied to the vents, but obviously this is not necessary.

Clamps 32, shown in Fig. 1 conventionally, are employed for holding the mold in position when blowing pressure is applied.

It will be apparent that the invention can be variously modified and adapted within the scope of the appended claim.

I claim:

The method which comprises applying molten glass to a supporting surface, positioning a mold over the glass on said surface, decreasing the pressure in said mold and increasing the pressure between said glass and said surface during the molding operation.

ANDREW H. STEWART.